(12) United States Patent
Naim et al.

(10) Patent No.: US 10,129,855 B1
(45) Date of Patent: Nov. 13, 2018

(54) SYSTEMS AND METHODS FOR EFFICIENT TRANSMISSIONS OF MULTICAST CONTENT TO WIRELESS DEVICES

(71) Applicant: Sprint Spectrum LP, Overland Park, KS (US)

(72) Inventors: Muhammad A Naim, Sterling, VA (US); Yu Zhou, Herndon, VA (US); Volkan Sevindik, Reston, VA (US); Shahzada Rasool, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 60 days.

(21) Appl. No.: 14/706,265

(22) Filed: May 7, 2015

(51) Int. Cl.
*H04W 72/04* (2009.01)
*H04L 12/18* (2006.01)

(52) U.S. Cl.
CPC ......... *H04W 72/0406* (2013.01); *H04L 12/18* (2013.01)

(58) Field of Classification Search
None
See application file for complete search history.

(56) References Cited

U.S. PATENT DOCUMENTS

| 6,377,548 | B1 | 4/2002 | Chuah | |
| 8,693,446 | B2* | 4/2014 | Inohiza | H04W 72/042 370/329 |
| 2003/0053440 | A1* | 3/2003 | Gruhn | H04W 28/06 370/349 |
| 2004/0037237 | A1* | 2/2004 | Lalwaney | H04J 13/0048 370/320 |
| 2006/0153179 | A1* | 7/2006 | Ho | H04L 12/5601 370/386 |
| 2007/0189248 | A1* | 8/2007 | Chang | H04L 1/0066 370/338 |
| 2007/0206532 | A1* | 9/2007 | Munzner | H04W 16/10 370/329 |
| 2008/0268907 | A1* | 10/2008 | Senarath | H04L 1/16 455/561 |
| 2009/0150736 | A1* | 6/2009 | Nebat | H04L 1/0084 714/748 |
| 2009/0310553 | A1* | 12/2009 | Kim | H04W 72/085 370/329 |
| 2010/0195555 | A1* | 8/2010 | Cheng | H04L 12/1877 370/312 |
| 2010/0260068 | A1* | 10/2010 | Bhatt | H04W 48/16 370/254 |
| 2011/0002293 | A1* | 1/2011 | Yuk | H04W 72/0406 370/329 |

(Continued)

OTHER PUBLICATIONS

LTE Multimedia Broadcast Multicast Services (MBMS), Aug. 2014, www.jdsu.com/nse.

(Continued)

*Primary Examiner* — Andrew Oh

(57) ABSTRACT

Systems and methods are described for transmitting multicast content via a unicast mode of transmission. An access node schedules wireless transmissions to a plurality of wireless devices to transmit separate control and header information to each of the wireless devices. The access node also schedules wireless transmissions to the plurality of wireless devices to transmit a single multicast content payload that is commonly used by all of the wireless devices.

14 Claims, 7 Drawing Sheets

(56) References Cited

U.S. PATENT DOCUMENTS

| | | | |
|---|---|---|---|
| 2011/0032860 A1* | 2/2011 | Kojima | H04L 1/0003 370/312 |
| 2011/0103286 A1 | 5/2011 | Montojo et al. | |
| 2011/0164586 A1* | 7/2011 | Kim | H04W 28/06 370/329 |
| 2012/0076092 A1* | 3/2012 | Lu | H04W 28/18 370/329 |
| 2012/0263089 A1 | 10/2012 | Gupta et al. | |
| 2013/0028118 A1* | 1/2013 | Cherian | H04W 72/005 370/252 |
| 2013/0044694 A1* | 2/2013 | Aguirre | H04W 28/16 370/329 |
| 2013/0128768 A1* | 5/2013 | Balasubramanian | H04L 1/0038 370/254 |
| 2013/0235784 A1* | 9/2013 | Kim | H04W 72/005 370/312 |
| 2013/0294321 A1* | 11/2013 | Wang | H04W 4/06 370/312 |
| 2013/0322370 A1* | 12/2013 | Fong | H04W 72/048 370/329 |
| 2014/0016580 A1* | 1/2014 | Kim | H04W 72/042 370/329 |
| 2014/0056243 A1* | 2/2014 | Pelletier | H04W 74/04 370/329 |
| 2014/0064216 A1* | 3/2014 | Agiwal | H04L 1/0031 370/329 |
| 2014/0204831 A1* | 7/2014 | Kim | H04L 69/22 370/312 |
| 2014/0226552 A1 | 8/2014 | Niu et al. | |
| 2014/0269632 A1* | 9/2014 | Blankenship | H04W 76/025 370/336 |
| 2014/0355493 A1* | 12/2014 | Niu | H04W 76/40 370/280 |
| 2014/0376442 A1* | 12/2014 | Kim | H04W 4/70 370/312 |
| 2015/0257187 A1* | 9/2015 | Kwon | H04L 12/18 370/329 |
| 2015/0341829 A1* | 11/2015 | Futaki | H04W 36/28 370/331 |
| 2016/0029401 A1* | 1/2016 | Fukuta | H04W 72/1205 370/329 |
| 2016/0150502 A1* | 5/2016 | Sebire | H04W 72/04 455/450 |
| 2016/0323719 A1* | 11/2016 | Wang | H04W 4/08 |
| 2016/0323805 A1* | 11/2016 | Ryu | H04W 36/0055 |
| 2017/0006598 A1* | 1/2017 | Uemura | H04L 5/0048 |
| 2017/0094571 A1* | 3/2017 | Yu | H04W 36/08 |
| 2017/0215158 A1* | 7/2017 | Zhu | H04W 56/001 |
| 2017/0238163 A1* | 8/2017 | Chen | H04W 8/005 370/328 |
| 2017/0339554 A1* | 11/2017 | Chen | H04W 8/22 |

OTHER PUBLICATIONS

Delivering content with LTE Broadcast, Ericsson Review, Feb. 11, 2013.

\* cited by examiner

SYSTEMS AND METHODS FOR EFFICIENT TRANSMISSIONS OF MULTICAST CONTENT TO WIRELESS DEVICES

TECHNICAL BACKGROUND

Telecommunication systems, such as cellular networks or other wireless networks, use various modes to transmission data to wireless devices. For example, data intended for multiple users, such as multicast content, may be transmitted to various wireless devices via a unicast transmission mode or a multicast transmission mode. Systems that efficiently transmit multicast content via a unicast mode of transmission may be able to provide a high quality service to users of the system.

OVERVIEW

Systems and methods are described for efficiently transmitting multicast content to wireless devices. The systems and method include an access node, such as a processor of the access node, scheduling wireless transmissions to a plurality of wireless devices to transmit separate control and header information to each of the wireless devices. The systems and methods further include the access node, such as the processor of the access node, scheduling wireless transmissions to the plurality of wireless devices to transmit a single multicast content payload that is commonly used by all of the wireless devices.

DETAILED DESCRIPTION

The various exemplary embodiments described herein contemplate systems and methods for transmitting multicast content via a unicast transmission mode with enhanced efficiency. As will be described below, the various exemplary embodiments of methods and systems transmit multicast content to a plurality of wireless devices by transmitting a single multicast content payload. For example, the multicast content data can be obtained from a multicast service center and split into header and control information and a multicast content payload. Control data may be transmitted to wireless devices, such as via an access node, with the control data including information that directs the wireless devices to resources dedicated to header and control information for each wireless device and to a single set of resources for the multicast content payload so that the same multicast content resources are used (e.g., shared) by all of the wireless devices.

Figure 1:
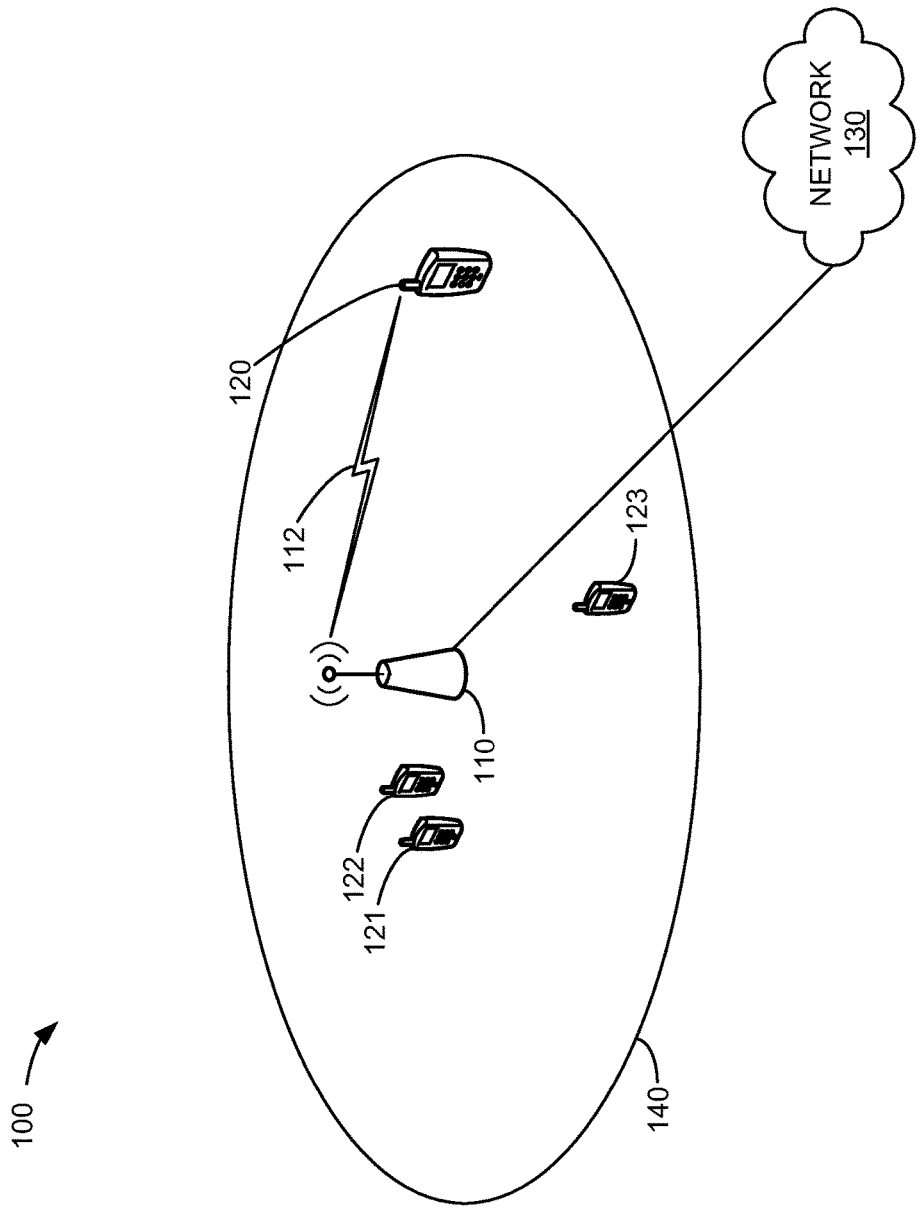
FIG. 1 schematically illustrates an exemplary communication system to schedule transmissions from an access node to a wireless device.

FIG. 1 illustrates an exemplary communication system 100 for transmitting multicast content in a wireless communication network. According to an exemplary embodiment, communication system 100 comprises wireless devices 120-123, access node 110, and communication network 130. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 110 and communication network 130 that are omitted for clarity, including additional processing nodes, routers, gateways, and physical and/or wireless data links for carrying data among the various network elements.

Each of wireless devices 120-123 can be any device configured to communicate over system 100 using a wireless communication link. For example, wireless devices 120-123 can include a cell phone, a smart phone, a computing platform such as a laptop, palmtop, or a tablet, a personal digital assistant, or an internet access device, and combinations thereof. It is noted that while four wireless devices are illustrated in the exemplary embodiment of FIG. 1, which can be in communication with access node 110, any number of wireless devices can be implemented according to the various exemplary embodiments disclosed herein.

Wireless devices 120-123 can transmit and/or receive information over system 100 using various communication services. These services can include various voice, data, and/or MBMS services and applications. Such services may include, for example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access node 110 can be any network node configured to provide communication between any of wireless devices 120-123 and communication network 130. Access node 110 can be a short range access node or a standard access node. According to an exemplary embodiment, a short range access node could include a microcell base station, a picocell base station, a femtocell base station, or the like and a standard access node could include a base transceiver station, a radio base station, an eNodeB device, or an enhanced eNodeB device, or the like. It is noted that while one access node 110 is illustrated in the exemplary embodiment of FIG. 1, any number of access nodes can be implemented within system 100.

Communication network 130 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment.

Communication network 130 can be capable of carrying data, for example, to support voice, push-to-talk, broadcast video, and data communications by a wireless device, such as any of wireless devices 120-123. Wireless network protocols can comprise, for example, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 130 comprise, for example, Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). According to an exemplary embodiment, communication network 130 can also comprise additional base stations, controller nodes, telephony switches, internet routers, network gateways, computer systems, communication links, or other types of communication equipment, and combinations thereof.

Communication link 112 can be wired or wireless and use various communication protocols such as, for example, Internet, Internet protocol (IP), local-area network (LAN), optical networking, hybrid fiber coax (HFC), telephony, T1, or some other communication format, including combinations, improvements, or variations thereof. Although a communication link is depicted between only wireless device 120 and access node 110, any of wireless devices 120-123 may be linked to access node 110 via a communication link. According to an exemplary embodiment, wireless communication links can be, for example, a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used than those specified in the various exemplary embodiments described herein. Link 112 can be a direct link or may include various equipment, intermediate components, systems, and networks, according to an exemplary embodiment.

System 100 may use a plurality of carriers to provide wireless communication services, according to an exemplary embodiment. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may be further divided into subcarriers. According to an exemplary embodiment, a frequency band may comprise a carrier, a channel, a subcarrier, a plurality of any of these, or any other suitable frequency band.

As depicted in the exemplary embodiment of FIG. 1, access node 110 may have a signal area 140. Signal area 140 may comprise an area around access node 110 where a wireless device may detect wireless signals transmitted from access node 110 at a signal level above a threshold. For example, signal area 140 may comprise a coverage area for access node 110, such that wireless devices (e.g., wireless devices 120-123) that fall within signal area 140 are provided wireless resources by access node 110.

Figure 2:
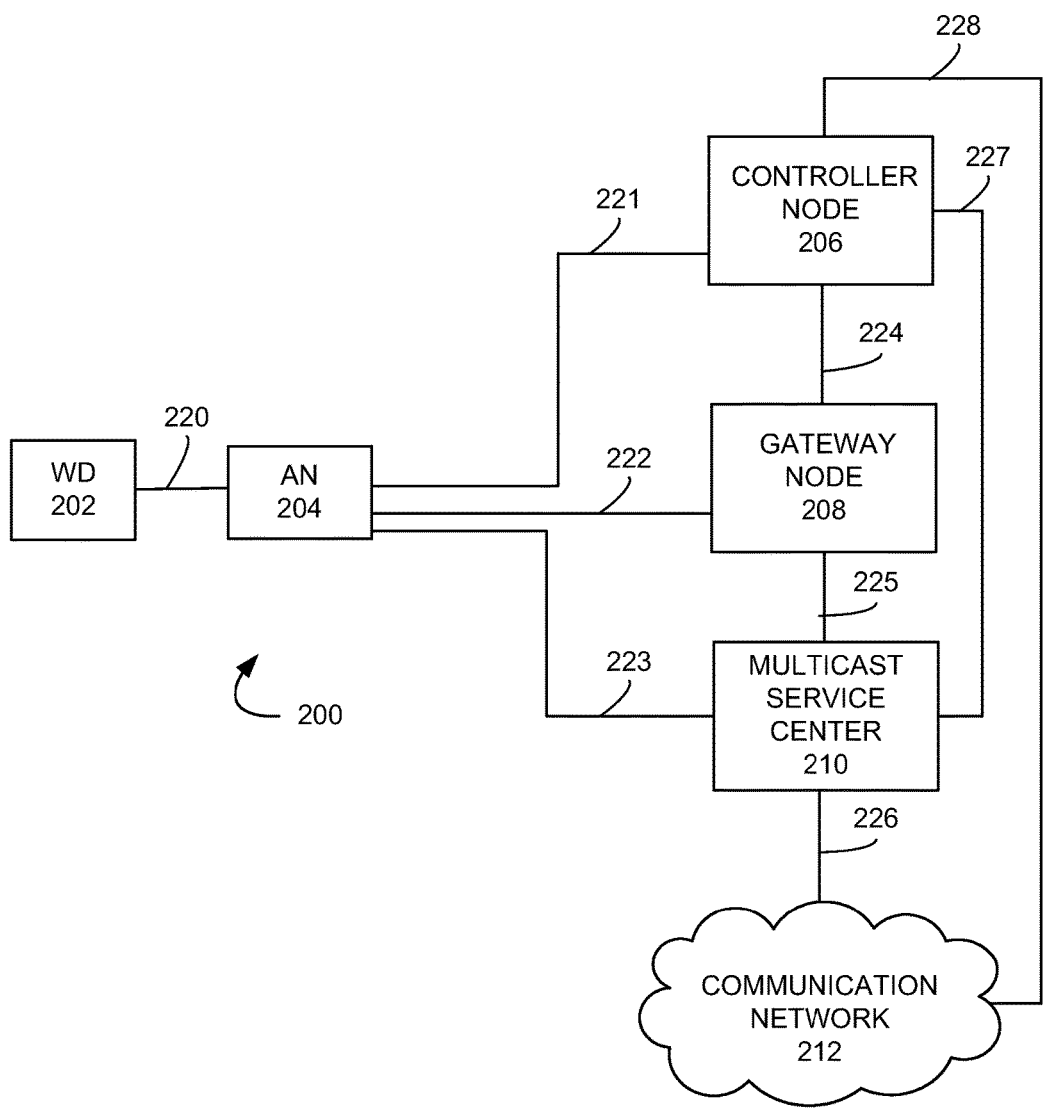
FIG. 2 illustrates an exemplary communication system capable of transmitting multicast content to a wireless device.

FIG. 2 illustrates another exemplary communication system 200 to transmit multicast content to one or more wireless devices. Communication system 200 may comprise wireless device 202, access node 204, controller node 206, gateway node 208, multicast service center 210, communication network 212, and communication links 220-228. Other network elements may be present in communication system 200 to facilitate communication but are omitted for clarity, such as base stations, base station controllers, gateways, mobile switching centers, dispatch application processors, and location registers such as a home location register or visitor location register.

Wireless device 202 can be any device configured to communicate over communication system 200 using a wireless communication link. For example, wireless device 202 can include a cell phone, a smart phone, a computing platform such as a laptop, palmtop, or a tablet, a personal digital assistant, or an internet access device, and combinations thereof. Although a single wireless device 202 is depicted in the exemplary embodiment of FIG. 2, other numbers of wireless devices may be used in communication system 200.

Access node 204 is a network node capable of providing wireless communications to wireless device 202, and can be, for example, a base transceiver station, a radio base station, or an eNodeB device. According to an exemplary embodiment, access node 204 can comprise a serving access node for wireless device 202. Access node 204 may communicate with controller node 206 over communication link 221, with gateway node 208 over communication link 222, and with multicast service center 210 over communication link 223. When communication system 200 includes a plurality of access nodes (not shown in the exemplary embodiment of FIG. 2), the access nodes may communicate directly with each other over communication links (not shown in FIG. 2) linking the various access nodes to one another.

Controller node 206 can be any network node configured to manage services within system 200. Controller node 206 may provide other control and management functions for system 200. Controller node 206 can be a single device having various functions or a plurality of devices having differing functions, according to an exemplary embodiment. For example, controller node 206 can include at least one of a multi-cell/multicast coordination entity (MCE), a mobility management entity (MME), a radio network controller (RNC), a mobile switching center (MSC), and combinations thereof.

According to an exemplary embodiment, controller node 206 can comprise a processor and associated circuitry to execute or direct the execution of computer-readable instructions to obtain information. Controller node 206 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 206 can receive instructions and other input at a user interface, according to an exemplary embodiment. Controller node 206 can comprise a processor and associated circuitry to execute or direct the execution of computer-readable instructions to obtain information. As depicted in the exemplary embodiment of FIG. 2, controller node 206 may be in direct communication with communication network 212, such as via communication link 228.

Gateway node 208 is a network element that can comprise a processor and associated circuitry to execute or direct the execution of computer-readable instructions, according to an exemplary embodiment. Gateway node 208 may retrieve and execute software from storage. Storage may include, for example, a disk drive, flash drive, memory circuitry, or some other memory device, that can be local or remotely accessible. According to an exemplary embodiment, the software comprises computer programs, firmware, or some other form of machine-readable instructions, and may include an operating system, utilities, drivers, network interfaces, applications, or some other type of software, including combinations thereof. According to an exemplary embodiment, gateway node 208 can provide to access nodes of system 200 (e.g., access node 204) instructions related to channel selection for communications with wireless devices (e.g., wireless device 202). For example, gateway node 208 can comprise at least one of a serving gateway (SGW), a packet data network gateway (PDNGW), a cellular gateway (CGW), and combinations thereof.

Multicast service center 210 receives multicast content from communication network 212 and provides the multicast content to access node 204 for transmission to wireless device 202. Multicast content can include, for example, television broadcasts, motion picture streaming, software updates, and other media that is transmitted as multicast content to a plurality of users. Multicast service center 210 can comprise a processor and associated circuitry to execute or direct the execution of computer-readable instructions, according to an exemplary embodiment. Multicast service center 210 may retrieve and execute software from storage. Multicast service center 210 may communicate with access node 204 via communication link 223, which may include a multicast gateway node (not shown) to provide a gateway between multicast service center 210 and access node 204 for providing multicast content to access node 204. Further, multicast service center 210 may be in direct communication with controller node 206, such as via communication link 227.

Communication network 212 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment. Communication network 212 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network comprise, for example, Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 220-228 can be wired or wireless communication links, according to an exemplary embodiment. Wired communication links can be, for example, twisted pair cable, coaxial cable or fiber optic cable, or combinations thereof. Wireless communication links can be, for example, a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 200 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 204, controller node 206, gateway node 208, multicast service center 210, and communication network 212 that are omitted for clarity, including, for example, additional processing nodes, routers, gateways, and physical and/or wireless data links for carrying data among the various network elements. In an embodiment, any of controller node 206, gateway node 208, multicast service center 210, and one or more modules of the access node(s) (e.g., access node 204) may perform all or parts of the methods of FIGS. 6 and 7, as illustrated in the various exemplary embodiments described herein.

Multicast content may be transmitted to one or more wireless devices via a unicast transmission mode or a multicast transmission mode. The multicast content can be, for example, streaming video, streaming audio, software updates, or other types of content that may be available to multiple wireless devices in communication with a network.

Figure 3:
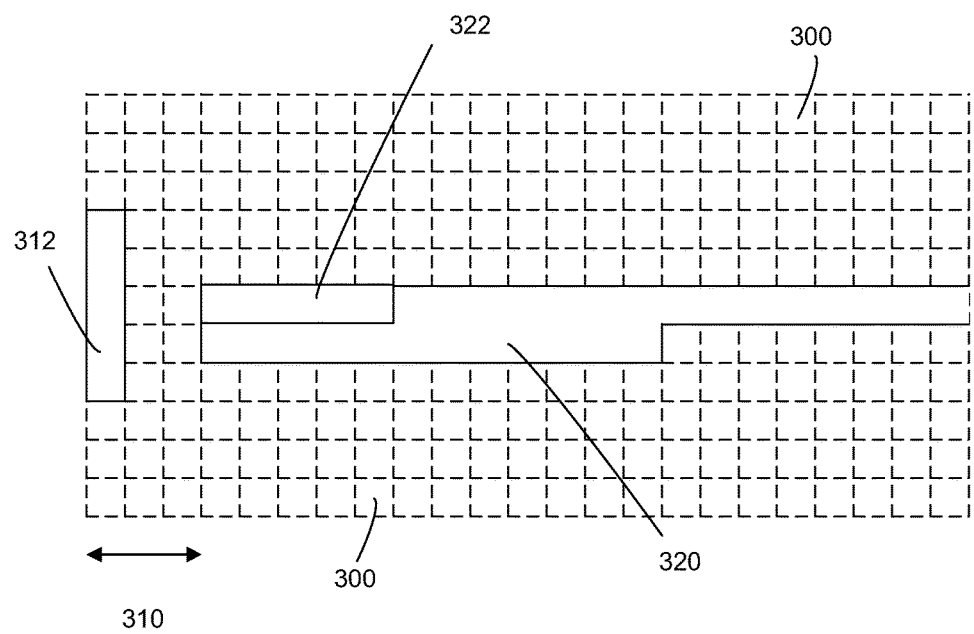
FIG. 3 illustrates an exemplary use of resources for a multicast method of transmitting multicast content.

As depicted in FIG. 3, a use of resources is depicted for a multicast method of transmitting multicast content, according to an exemplary embodiment. The array of resources depicted in FIG. 3 includes a plurality of resource blocks 300. According to an exemplary embodiment, the horizontal axis for the array of resource blocks 300 represents time (e.g., slots of a subframe for downlink) and the vertical axis represents frequency so that various resource blocks may be used at a given time. As depicted in FIG. 3, a set of over the air resources may be dedicated to control data 310 transmitted to one or more wireless devices, such as to inform the wireless devices about transmissions from a node (e.g., node 110, 204). In the example of a multicast method of transmitting multicast content, the control data 312 for multicast content may include information about which resources will be allocated for multicast transmissions, such as control and header information 322 and a single multicast payload 320. All wireless devices in a network may receive the multicast transmission aby accessing the same control data 312, the same control and header information 322, and the same multicast payload 320. Further, the multicast transmission may be made over a plurality of access nodes (e.g., node 110, 204) to the plurality of wireless devices.

A multicast mode of transmission uses dedicated fixed resources that are used by all wireless devices instead of dedicating separate resources for individual wireless devices. As discussed above with regard to FIG. 3, a single packet of header and control information and multicast content payload may be transmitted by various nodes that schedule the same resources for transmission to multiple wireless devices. The amount of resources dedicated for transmitting content via the multicast mode of transmission may be, for example, about 20% of network resources. Such an arrangement is advantageous because as the number of wireless devices receiving the content increases, the amount of resources dedicated to transmitting the content remains the same. Thus, the benefits of the multicast mode of transmission increase as the number of wireless devices accessing the information increases.

Although the multicast mode of transmission provides benefits, it is not the most efficient mode of transmission for all situations. For example, the unicast mode of transmission can be more efficient than the multicast mode of transmission when a relatively low number of wireless devices are receiving the multicast content. In such a situation the amount of over the air resources dedicated to transmitting the multicast content via a unicast mode of transmission may be less than for a multicast mode of transmission.

Figure 4:
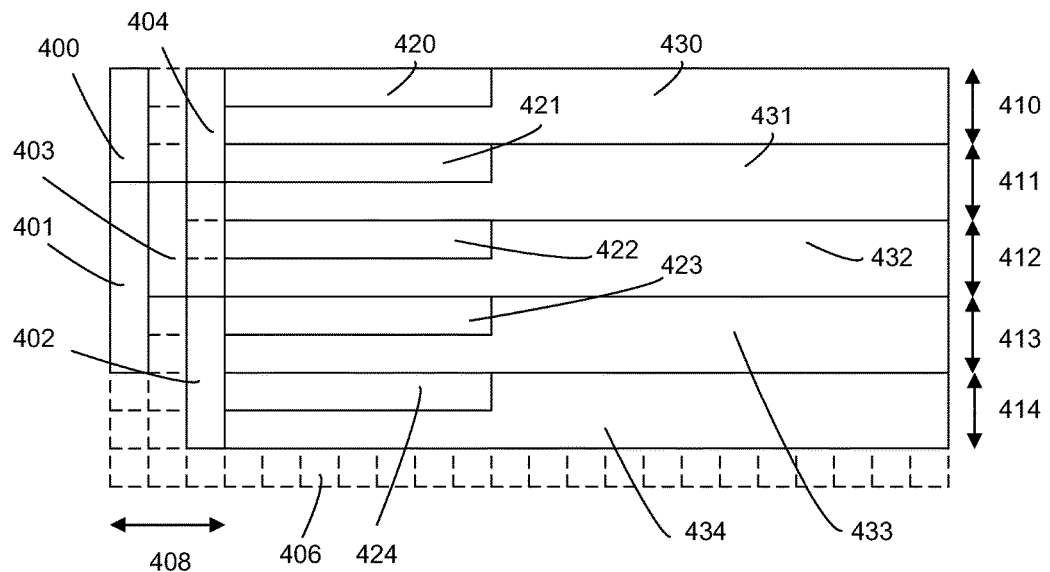
FIG. 4 illustrates an exemplary use of resources for a unicast method of transmitting content.

Turning to FIG. 4, a use of resources is depicted for a unicast method of transmitting content, according to an exemplary embodiment. The array of resources depicted in FIG. 4 includes a plurality of resource blocks 406. According to an exemplary embodiment, the horizontal axis for the array of resource blocks 406 represents time (e.g., slots of a subframe for downlink) and the vertical axis represents frequency so that various resource blocks may be used at a given time.

As depicted in FIG. 4, a set of over the air resources may be dedicated to control data 408 transmitted to one or more wireless devices, such as to inform the wireless devices about transmissions from a node (e.g., node 110, 204). In the exemplary embodiment of FIG. 4, control data 408 includes first wireless device control data 400, second wireless device control data 401, third wireless device control data 402, fourth wireless device control data 403, and fifth wireless device control data 404. The unicast mode of transmitting multicast content involves allocating over the air resources to wireless devices on an individual basis. Thus, when the node schedules transmissions of multicast content, such as via a unicast mode of transmission, control data 400-404 includes information about which resources will be allocated for unicast transmissions for each wireless device.

Due to the individual allocation of over the air resources for each wireless device in a unicast mode of transmission, the node is scheduled to transmit a packet of data dedicated to each wireless device. As depicted in FIG. 4, a first packet 410 is dedicated to the first wireless device, a second packet 411 is dedicated to the second wireless device, a third packet 412 is dedicated to the third wireless device, a fourth packet 413 is dedicated to the fourth wireless device, and a fifth packet 414 is dedicated to the fifth wireless device. Each packet includes control and header information, as well as a payload of multicast content. For example, first packet 410 includes first control and header information 420 and a first payload of multicast content 430, second packet 411 includes second control and header information 421 and a second payload of multicast content 431, third packet 412 includes third control and header information 422 and a third payload of multicast content 432, fourth packet 413 includes fourth control and header information 423 and a fourth payload of multicast content 433, and fifth packet 414 includes fifth control and header information 424 and a fifth payload of multicast content 434. Therefore, the first wireless device control data 400 may direct a first wireless device to use the resources dedicated for the first control and header information 420 and for the first payload of multicast content 430 so the wireless device may receive the multicast content. Similarly, in the exemplary embodiment of FIG. 4, the second wireless device control data 401 may direct a second wireless device to the second control and header information 421 and the second payload of multicast content 431, the third wireless device control data 402 may direct a third wireless device to the third control and header information 422 and the third payload of multicast content 432, the fourth wireless device control data 403 may direct a fourth wireless device to the fourth control and header information 423 and the fourth payload of multicast content 433, and the fifth wireless device control data 404 may direct a fifth wireless device to the fifth control and header information 424 and the fifth payload of multicast content 434.

As shown in the exemplary embodiment of FIG. 4, the unicast mode schedules non-overlapping resources to transmit the multicast content to wireless devices. As a result, as the number of wireless devices increases, the amount of over the air resources dedicated to unicast transmissions increases in order to deliver multicast content to the increasing number of wireless devices.

In view of the advantages of unicast transmission in such situations, it would be desirable to provide systems and methods for transmitting multicast content via a unicast transmission mode with enhanced efficiency. The various exemplary embodiments described herein contemplate methods and systems to transmit multicast content to a plurality of wireless devices by transmitting a single multicast content payload. For example, the methods and systems of the various exemplary embodiments described herein contemplate obtaining multicast content data from a multicast service center and splitting the data into header and control information and a multicast content payload. The splitting may be performed, for example, by a node of a network. Control data may be transmitted to wireless devices, such as via the node, with the control data including information that directs the wireless devices to resources dedicated to header and control information for each wireless device and to a single set of resources for the multicast content so that the multicast content resources are used (e.g., shared) by all of the wireless devices.

Figure 5:
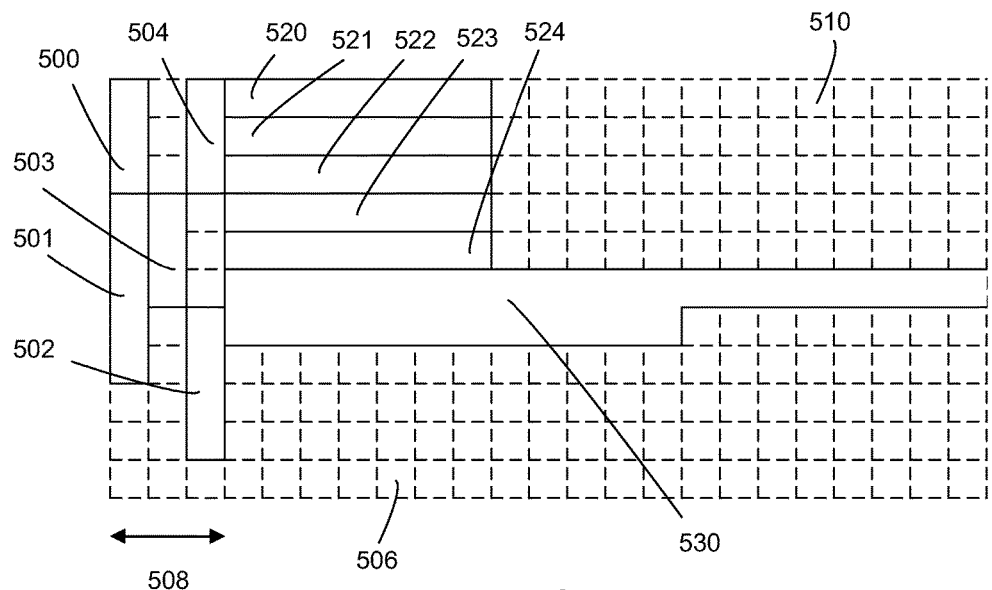
FIG. 5 illustrates an exemplary use of resources for a method of transmitting multicast content in a unicast environment.

Turning to FIG. 5, a use of resources is depicted for a unicast method of transmitting multicast content using a single multicast content payload for a plurality of wireless devices, according to an exemplary embodiment. Similar to the exemplary embodiment of FIG. 4, the array of resources depicted in FIG. 5 includes a plurality of resource blocks 506. According to an exemplary embodiment, the horizontal axis for the array of resource blocks 506 represents time (e.g., slots of a subframe for downlink) and the vertical axis represents frequency. As a result, various resource blocks may be used at a given time.

As depicted in FIG. 5, a set of over the air resources may be dedicated to control data 508 transmitted to one or more wireless devices, such as to inform the wireless devices about transmissions from a node (e.g., node 110, 204). In the exemplary embodiment of FIG. 5, control data 508 includes first wireless device control data 500, second wireless device control data 501, third wireless device control data 502, fourth wireless device control data 503, and fifth wireless device control data 504. According to an exemplary embodiment, control data 500-504 may be scheduled to use any resources allocated for control data, such as any of the over the air resources located within the portion of the array identified as control data 508 in FIG. 5. In other words, the control data 500-504 does not need to be transmitted to wireless devices using resources dedicated to particular wireless devices. The control data 500-504 may be sent via a downlink control channel, according to an exemplary embodiment.

Control data 500-504 can be used to direct first through fifth wireless devices to resources dedicated for each wireless device to control and header information and to resources dedicated to a multicast content payload. According to an exemplary embodiment, a multicast service center (e.g., multicast service center 210 of FIG. 2) can provide multicast content data to a node (e.g. node 110, 204). The data informs the node about the size (e.g., length or number of resources) of multicast content payload and includes control and header information that can be transmitted to each wireless device. The node may split the data into a multicast content payload and header & control information, although the operation to split the data may be undertaken at other points in a network, such as at the multicast service center, a controller node (e.g., controller node 206), or other network component.

A node may schedule transmission of control data, such as control data 500-504 in FIG. 5, to wireless devices to inform each wireless device which resources are used for header & control info and which resources are used for multicast content. As depicted in the exemplary embodiment of FIG. 5, a first header and control information 520 may be dedicated for a first wireless device, a second header and control information 521 may be dedicated for a second wireless device, a third header and control information 522 may be dedicated for a third wireless device, a fourth header and control information 523 may be dedicated for a fourth wireless device, and a fifth header and control information 524 may be dedicated for a fifth wireless device. Therefore, first control data 500 may direct a first wireless device to the use the resources dedicated for first header and control information 520. Similarly, second control data 501 may direct a second wireless device to second head and control information 521, third control data 502 may direct a second wireless device to second head and control information 522, fourth control data 503 may direct a second wireless device to second head and control information 523, and fifth control data 504 may direct a second wireless device to second head and control information 524. Thus, the node schedules transmission of header and control information to each wireless device by using separate, non-overlapping resources.

To transmit multicast content to the wireless devices, the node schedules transmission of a single multicast content payload 530 that is used by all of the wireless devices. As shown in the exemplary embodiment of FIG. 5, the multicast content payload 530 is scheduled once, not separately to each wireless device, and can have a fixed size (e.g., fixed number of resources). Thus, each of the control data 500-504 directs each wireless device to the same resources for receiving the multicast content payload 530. In other words, each wireless device is directed (e.g., via respective control data 500-504) to different resources (e.g., control and header information 520-524) dedicated for each wireless device but directed (e.g., via the respective control data 500-504) to the same resources (e.g., multicast content payload 530) to receive the multicast content. As a result, the efficiency of a unicast mode of transmitting multicast content may be enhanced because fewer resources are used. For instance, by comparing the number of resources used in the exemplary embodiment of FIG. 4 to the resources used for the exemplary embodiment of FIG. 5, one can readily see that fewer resources are dedicated to the transmission of multicast content when using a single multicast payload.

The various exemplary embodiments described herein for transmitting multicast content via a single payload may be utilized whenever a unicast mode of transmitting multicast content is implemented. Further, the number of wireless devices receiving the multicast content can vary from the number of devices indicated in the exemplary embodiment of FIG. 5. For example, one, two, three, four, five, six, seven, eight, nine, ten, or more wireless devices may receive multicast via a single payload, according to the various exemplary embodiments described herein.

The systems and methods described herein further contemplate determining the mode of transmitting multicast content. In view of the considerations discuss herein for the unicast mode of transmissions and for the multicast mode of transmissions, systems and methods may include determining whether to transmit multicast content via the unicast mode of transmission or via the multicast mode of transmission.

Figure 6:
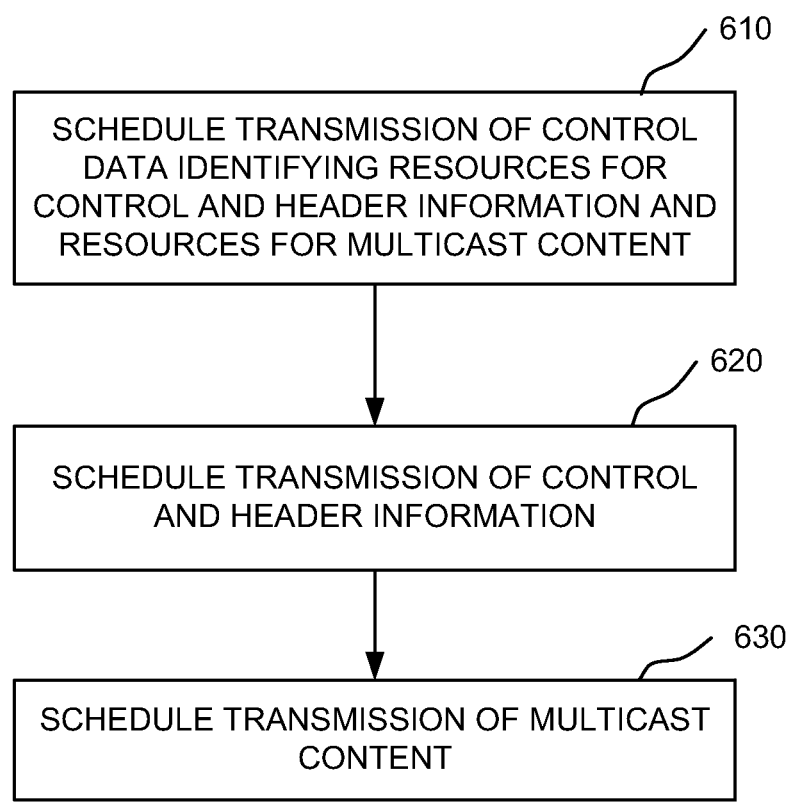
FIG. 6 illustrates an exemplary method of transmitting multicast content.

FIG. 6 illustrates a method of transmitting multicast content with a single multicast content payload, according to an exemplary embodiment. In step 610, control data (e.g., control data 500-504 in FIG. 5) identifying resources dedicated to control and header information (e.g., control and header information 520-524 in FIG. 5) and multicast content payload (e.g., payload 530 in FIG. 5) is scheduled for transmission to a plurality of wireless devices. As described above, the control and header information and the multicast content payload may be received by a node as multicast content data, which may split the data into the control and header information and the multicast content payload. As shown in FIG. 6, the node may schedule transmission of the control and header information to the plurality of users in step 620. As discussed above with regard to FIG. 5, the control and header information may be scheduled to use separate, non-overlapping resources so that each wireless device receives control and header information via resources separately dedicated for each wireless device. In step 630, the node can schedule transmission of a single multicast content payload that is used by each wireless device, as discussed above with regard to FIG. 5.

According to an exemplary embodiment, a threshold may be used to determine whether scheduled transmissions are made using a unicast mode or a multicast mode. The threshold may be, for example, a predetermined number of wireless devices that are to receive the multicast content. For instance, if the number of wireless devices meets or exceeds the threshold for number of wireless devices, systems and methods may transmit multicast content via a multicast mode. Alternatively, the system and methods may transmit the multicast content when the number of wireless devices is less than the threshold for number of wireless devices. According to an exemplary embodiment, the threshold may be, for example, in the range of 8 wireless devices to 10 wireless devices.

Figure 7:
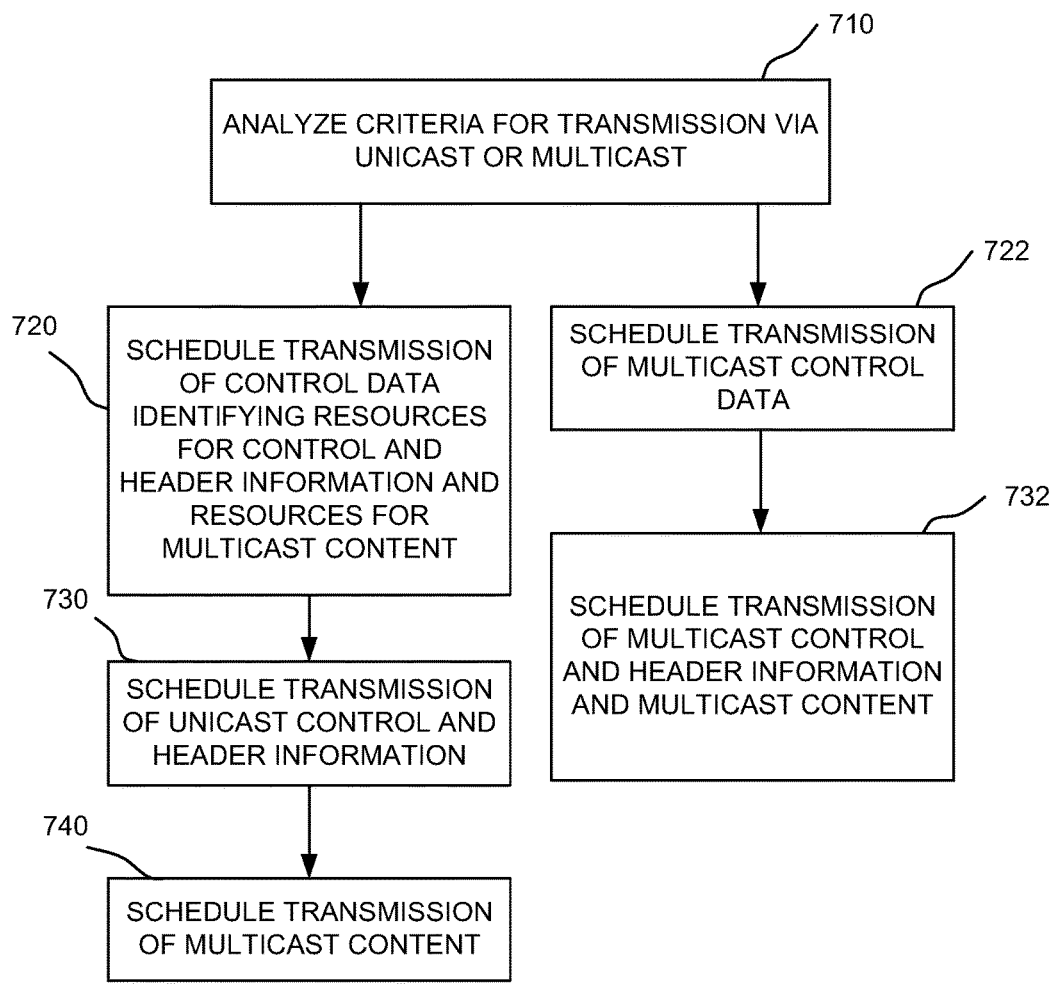
FIG. 7 illustrates another exemplary method of transmitting multicast content.

FIG. 7 illustrates a method of transmitting multicast content with a single multicast content payload via a unicast transmission or a multicast transmission, according to another exemplary embodiment. In step 710, the systems and methods described herein analyze criteria for whether multicast content should be transmitted via a multicast transmission or a unicast transmission. For example, a determination may be made whether a threshold is met, such as whether a predetermined number of wireless devices are to receive the multicast content, as described above. The determination may be made by, for example, an access node (e.g., node 110, 204), a controller node 206 (e.g., controller node 206), multicast service center (e.g., multicast service center 210), or other component of a communication system.

When a determination is made that the multicast content is to be transmitted via a unicast transmission, in step 720 control data (e.g., control data 500-504 in FIG. 5) identifying resources dedicated to control and header information (e.g., control and header information 520-524 in FIG. 5) and multicast content payload (e.g., payload 530 in FIG. 5) is scheduled for transmission to a plurality of wireless devices. As described above, the control and header information and the multicast content payload may be received by a node as multicast content data, which may split the data into the control and header information and the multicast content payload. As shown in FIG. 7, the node may schedule transmission of the control and header information to the plurality of users in step 730 and, in step 740, schedule transmission of a single multicast content payload that is used by each wireless device, as discussed above with regard to FIG. 5. When a determination is made that the multicast content is be transmitted via a multicast transmission, control data (e.g., control data 312) is scheduled for transmission in step 722 and transmission of a multicast control and header information (e.g., control and header information 322) and a single multicast content payload (e.g., payload 320) is scheduled in step 732, as discussed above with regard to FIG. 3.

Although the methods of the various exemplary embodiments described herein may perform steps in a particular order for purposes of illustration, the methods of the various exemplary embodiments discussed herein are not limited to any particular order or arrangement. One skilled in the art, using the disclosure provided herein, will appreciate that various steps of the methods can be omitted, rearranged, combined, and/or adapted in various ways.

Figure 8:
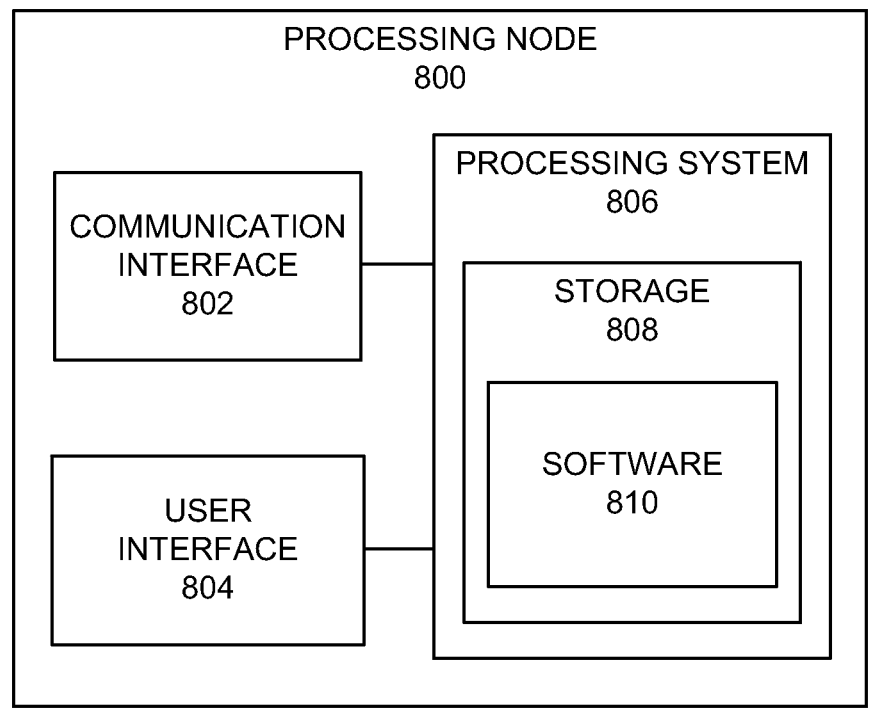
FIG. 8 illustrates an exemplary processing node.

The exemplary embodiment of FIG. 8 illustrates a processing node 800 of a communication system. Processing node 800 comprises communication interface 802, user interface 804, and processing system 806 in communication with communication interface 802 and user interface 804. Processing node 800 can be configured to determine, for example, a communication access node for a wireless device. According to an exemplary embodiment, processing system 806 includes storage 808, which can comprise a disk drive, flash drive, memory circuitry, or other memory device. Storage 808 can store software 810 used in the operation of the processing node 800, according to an exemplary embodiment. Storage 808 may include, for example, a disk drive, flash drive, data storage circuitry, or some other memory apparatus. Software 810 may include, for example, computer programs, firmware, or some other form of machine-readable instructions, including an operating system, utilities, drivers, network interfaces, applications, or some other type of software.

Processing system 806 may include, for example, a microprocessor and other circuitry to retrieve and execute software 810 from storage 808. Processing node 800 may further include other components such as, for example, a power management unit, a control interface unit, etc., which are omitted for clarity. According to an exemplary embodiment, communication interface 802 permits processing node 800 to communicate with other network elements. According to an exemplary embodiment, user interface 804 facilitates the configuration and control of the operation of processing node 800.

Examples of processing node 800 include, for example, controller node 206 and gateway node 208 of the exemplary embodiment of FIG. 2. According to an exemplary embodiment, processing node 800 can be an adjunct or component of a network element, such as an element of access nodes 104, or 204, and the like. Processing node 800 can also be another network element in a communication system, according to an exemplary embodiment. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for transmitting multicast content via a unicast mode of transmission, the method comprising:
   instructing an access node to schedule unicast mode wireless transmissions to a plurality of wireless devices, the unicast mode wireless transmissions including:
   control data for each wireless device of the plurality of wireless devices, the control data sent via a downlink control channel;
   a plurality of separate control and header information, wherein each separate control and header information of the plurality of separate control and header information is respectively dedicated to each wireless device of the plurality of wireless devices; and
   a single multicast content payload that is commonly used by all of the wireless devices,
   wherein the control data directs the wireless device to the dedicated separate control and header information and the multicast content payload; and
   scheduling a split of the multicast content data into the header and control information for each wireless device and the multicast content payload.

2. The method of claim 1, wherein the multicast content payload has a fixed size.

3. The method of claim 1, further comprising determining to transmit the multicast content via the unicast mode of transmission when a threshold has been met.

4. The method of claim 3, wherein meeting the threshold comprises the plurality of wireless devices numbering less than a predetermined number.

5. The method of claim 1, wherein the control data comprises first control data dedicated to a first wireless device of the plurality of wireless devices and second control data dedicated to a second wireless device of the plurality of wireless devices.

6. The method of claim 5, wherein the first control data directs the first wireless device to first control and header information of the plurality of separate control and header information and the multicast payload; and the second control data directs the second wireless device to second control and header information of plurality of separate control and header information and the multicast payload.

7. A system for transmitting multicast content via a unicast mode of transmission, the system comprising:

an access node comprising a processor configured to:

schedule unicast mode wireless transmissions to a plurality of wireless devices, the unicast mode wireless transmission including:

control data for each wireless device of the plurality of wireless devices, the control data scheduled to be sent via a downlink control channel;

separate control and header information dedicated to each wireless device of the plurality of wireless devices using separate, non-overlapping resource blocks of the content channel; and a single multicast content payload that is commonly used by all of the wireless devices using the content channel, wherein the control data directs the wireless device to the dedicated separate control and header information and the multicast content payload; and schedule a split of the multicast content data into the header and control information for each wireless device and the multicast content payload.

8. The system of claim 7, wherein the control data includes information to inform the wireless devices which resources are to be used for the wireless content payload used by all of the wireless devices.

9. The system of claim 7, wherein the processor is further configured to receive multicast content data, wherein the multicast content data includes the separate header and control information for each wireless device and the multicast content payload.

10. The system of claim 7, wherein the processor is further configured to determine the unicast mode as a mode to transmit the multicast content when a threshold has been met.

11. The system of claim 10, wherein the processor is further configured to determine the unicast mode as the mode to transmit the multicast content when the threshold comprises the plurality of wireless devices numbering less than a predetermined number.

12. The system of claim 7, wherein the wireless transmissions are in unicast mode.

13. The system of claim 7, wherein the control data comprises first control data dedicated to a first wireless device of the plurality of wireless devices and second control data dedicated to a second wireless device of the plurality of wireless devices.

14. The system of claim 13, wherein the first control data directs the first wireless device to first control and header information of the plurality of separate control and header information and the multicast payload; and the second control data directs the second wireless device to second control and header information of plurality of separate control and header information and the multicast payload.

* * * * *